United States Patent
Bailey

(10) Patent No.: US 10,611,205 B2
(45) Date of Patent: Apr. 7, 2020

(54) AUTO-LEVELING SUSPENSION AND METHOD FOR THE SAME

(71) Applicant: NIO USA, Inc., San Jose, CA (US)

(72) Inventor: Aaron R. Bailey, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 152 days.

(21) Appl. No.: 15/473,155

(22) Filed: Mar. 29, 2017

(65) Prior Publication Data

US 2018/0281548 A1   Oct. 4, 2018

(51) Int. Cl.
*B60G 17/0165*   (2006.01)

(52) U.S. Cl.
CPC ...... *B60G 17/0165* (2013.01); *B60G 2204/62* (2013.01); *B60G 2400/252* (2013.01); *B60G 2400/95* (2013.01); *B60G 2600/18* (2013.01); *B60G 2800/014* (2013.01); *B60G 2800/222* (2013.01)

(58) Field of Classification Search
CPC ............ B60G 17/0165; B60G 2204/62; B60G 2400/252; B60G 2400/95; B60G 2600/18; B60G 2800/014; B60G 2800/222
USPC ...................................................... 701/39, 37
See application file for complete search history.

(56) References Cited

U.S. PATENT DOCUMENTS

| | | | |
|---|---|---|---|
| 6,944,544 B1 * | 9/2005 | Prakah-Asante | ... B60R 21/0134 342/42 |
| 2005/0068224 A1 * | 3/2005 | De Mersseman | .. B60G 17/0164 342/70 |
| 2014/0195113 A1 * | 7/2014 | Lu | ...................... B60G 17/0165 701/37 |

* cited by examiner

*Primary Examiner* — Paula L Schneider
(74) *Attorney, Agent, or Firm* — Sheridan Ross P.C.

(57) ABSTRACT

A system and method for accounting for a mismatch that exists between a vehicle's bumper and potential impact point using an active suspension is disclosed. The system and method determine that a mismatch exists between a vehicle's bumper and a potential impact point and actuate the suspension to account for the determined mismatch. The system and method account for the mismatch existing between a vehicle's bumper and a potential impact point using a sensor for detecting that a mismatch exists between the bumper and the potential impact point, and a suspension configured to be actuated to account for the sensed mismatch to enable improved alignment of the bumper and the potential impact point.

18 Claims, 5 Drawing Sheets

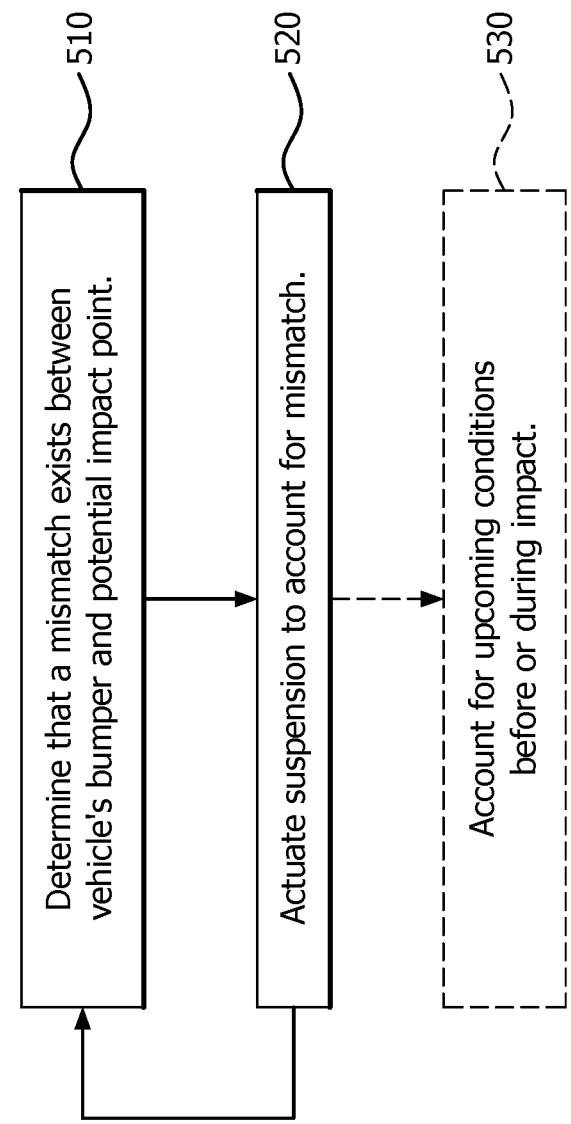

AUTO-LEVELING SUSPENSION AND METHOD FOR THE SAME

FIELD OF INVENTION

The present invention relates to an auto-leveling suspension and method for the same. More particularly, the present invention relates to an auto-leveling suspension that operates to place the bumper of a vehicle in line with a bumper or other protective device on of an object that the vehicle is going to collide with.

BACKGROUND

Vehicle bumpers are designed to provide protection against impact. The bumpers provide the ability to absorb impacts resulting from minor collisions. Bumpers offer protection to other vehicle components by dissipating the kinetic energy generated by an impact. Energy-absorbing crush zones are completely ineffective if they are physically bypassed; an extreme example of this occurs when the elevated platform of a tractor-trailer completely misses the front bumper of a passenger car, and first contact is with the glass windshield of the passenger compartment. Airbag deployment sensors typically do not trigger until contact with an obstruction, and it is important that front bumpers be the first parts of a vehicle to make contact in the event of a frontal collision, to leave sufficient time to inflate the protective cushions. The height and placement of bumpers may be legally specified, to ensure that when vehicles of different heights are in an accident, the smaller vehicle will not slide under the larger vehicle or other bad incidents happen as a result of misalignment. However, under certain conditions, such as during pre-collision braking, for example, the vehicle operation may change the height of the bumper. Therefore a need exists to provide vehicles with the ability to further ensure that any collision that occurs does so by contacting the bumper of the vehicle.

SUMMARY

A system and method for accounting for a mismatch that exists between a vehicle's bumper and potential impact point using an active suspension is disclosed. The system and method determine that a mismatch exists between a vehicle's bumper and a potential impact point and actuate the suspension to account for the determined mismatch. The system and method account for the mismatch existing between a vehicle's bumper and a potential impact point using a sensor for detecting that a mismatch exists between the bumper and the potential impact point, and a suspension configured to be actuated to account for the sensed mismatch to enable improved alignment of the bumper and the potential impact point.

The system and method account for the mismatches that result from braking conditions including those conditions that occur in the future. The system and method account for the mismatch associated with different makes of vehicles having different design heights for the bumpers. The mismatch may be a dip associated with braking.

The system and method may account for upcoming conditions that cause mismatch between the vehicle's bumper and the potential impact point. This includes conditions that occur before impact, such as those that result from the vehicle systems needing to cause additional braking causing further dip in the bumper.

The system and method may utilize a sensor including a ride height sensor. The sensor may be from at least one other vehicle system including the braking system, the camera system, the radar system, the LIDAR system, and the other autonomous hardware found on the vehicle.

BRIEF DESCRIPTION OF THE DRAWINGS

A more detailed understanding can be had from the following description, given by way of example in conjunction with the accompanying drawings wherein:

FIG. 5 illustrates a method for accounting for a mismatch that exists between a vehicle's bumper and a potential impact point, including a dip associated with braking, using an active suspension.

DETAILED DESCRIPTION

Bumpers offer protection to other vehicle components by dissipating the kinetic energy generated by an impact. This energy is a function of vehicle mass and velocity squared. The kinetic energy is equal to ½ the product of the mass and the square of the speed. In formula form: $E(k)=\frac{1}{2} mv^2$. Therefore, as the speed of impact doubles the force increases four-fold. Bumpers provide benefits when the bumper is impacted in a collision.

A system and method for accounting for a mismatch that exists between a vehicle's bumper and potential impact point using an active suspension is disclosed. The system and method determine that a mismatch exists between a vehicle's bumper and a potential impact point and actuate the suspension to account for the determined mismatch. The system and method account for the mismatch existing between a vehicle's bumper and a potential impact point using a sensor for detecting that a mismatch exists between the bumper and the potential impact point, and a suspension configured to be actuated to account for the sensed mismatch to enable improved alignment of the bumper and the potential impact point.

Figure 1:
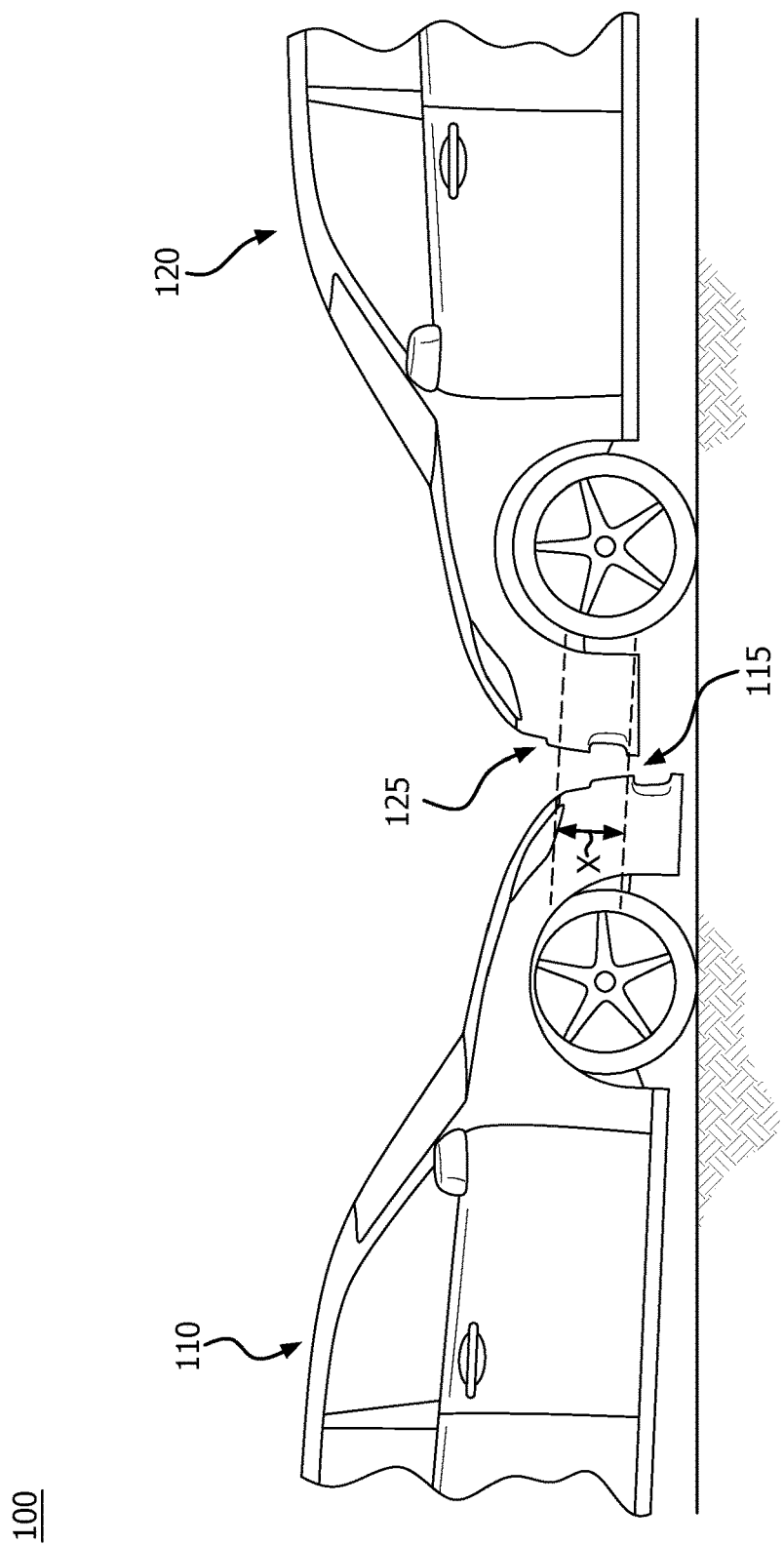
FIG. 1 illustrates a collision of two vehicles.

FIG. 1 illustrates a collision 100 of two vehicles. In collision 100, a first vehicle 110 having a front bumper 115 collides with a second vehicle 120 having a front bumper 125. As depicted the vehicles 110, 120 are identical, but this is for illustration only. Vehicle 110, 120 may each be of any kind, make or model and may be the same or different from each other.

Ideally, in such a collision, first vehicle front bumper 115 and second vehicle front bumper 125 collide and the impact is received by first vehicle 110 via bumper 115 and by second vehicle 120 via bumper 125. However, as depicted in FIG. 1, first vehicle 110 either via collision avoidance or by driver action, or both, realized the impact was coming and began to brake in order to avoid or minimize impact. This braking caused the first vehicle front bumper 115 to drop by an amount X. Because of the decrease in height of the first vehicle front bumper 115, the bumpers 115, 125 are now offset by the height X. X may be small in the case of a minor braking condition, in which case first vehicle front bumper 115 may still at least partially make contact with second vehicle front bumper 125. However, as X increases, such as with more extreme braking conditions or in situations where vehicle 110 and vehicle 120 already include some offset in the height of their respective bumper, such as because of differences in car class (like sedans and SUVs, for example), situations exist where first vehicle front bumper 115 and second vehicle front bumper 125 may not make contact in collision 100.

Both of bumpers 115, 125 represent a structure attached or integrated to the front and rear of vehicle 110, 120, respectively, to absorb impact in a minor collision, ideally protecting occupants and minimizing repair costs. Bumpers ideally minimize height mismatches between vehicles and protect pedestrians from injury. However, as the mismatch changes because of current driving conditions, such as braking to avoid a collision, the mismatch may be too great to minimize with just the size of bumper 115, 125.

Bumper 115, 125 may include a plastic cover over a reinforcement bar made of steel, aluminum, fiberglass composite, or plastic. Bumper 115, 125 may be made from a combination of polycarbonate (PC) and Acrylonitrile butadiene styrene (ABS) called PC/ABS.

Figure 2:
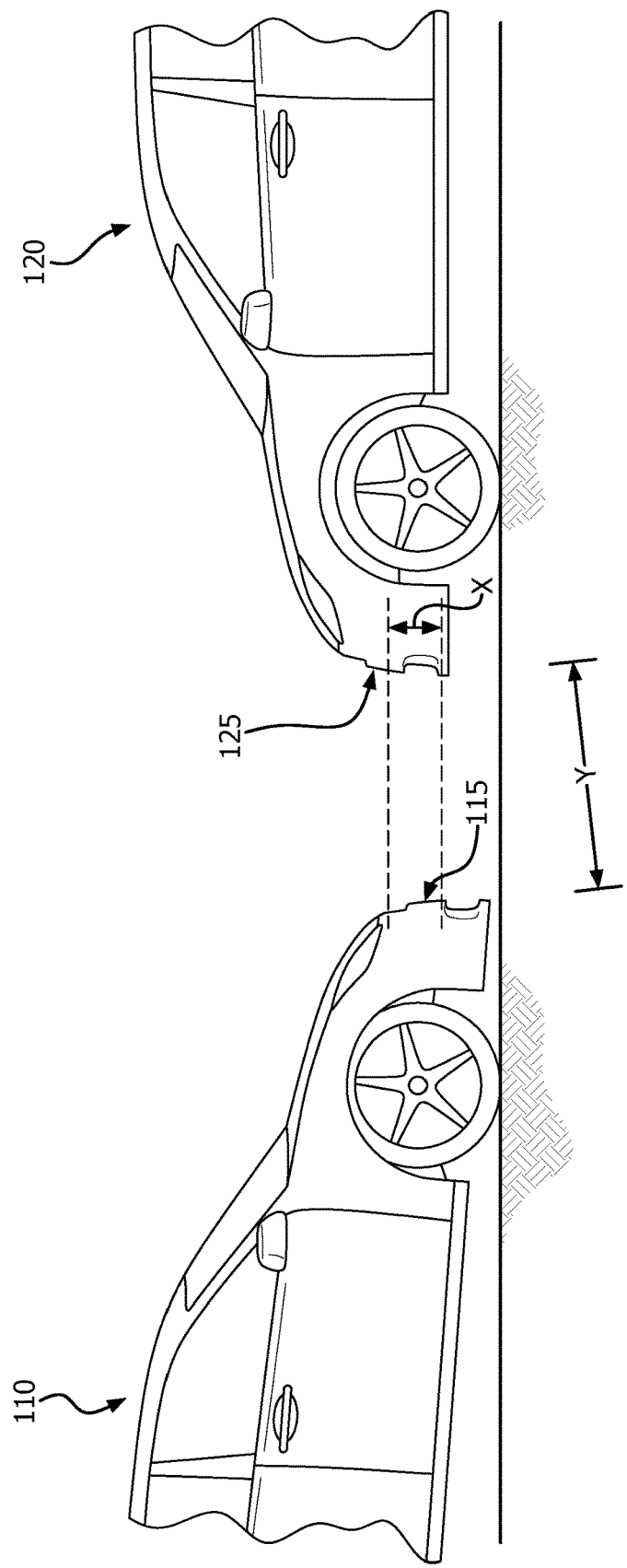
FIG. 2 illustrates the collision of FIG. 1 at an earlier time prior to the collision.

Using the collision 100 of FIG. 1 as an example collision 100, FIG. 2 illustrates the upcoming collision 100 at an earlier time prior to the collision and the point depicted in FIG. 1. As shown in FIG. 2, first vehicle 110 and second vehicle 120 are separated by a distance Y. For the ease of understanding, assume that vehicle 120 is stationary and unoccupied, although there is no reason both vehicles could not be moving and, in fact, both vehicles may be braking to avoid the impending collision. Based on the collision 100 of FIG. 1, first vehicle 110 upon detection of a collision either via collision avoidance or by driver action, or both, realized the impact was coming and began to brake in order to avoid or minimize the impact causing first vehicle front bumper 115 to drop by an amount X—the amount of the offset between the first vehicle front bumper 115 and the second vehicle front bumper since the vehicles 110, 120 are identical in this example. As such, the suspension (not shown) of vehicle 110 may be activated to elevate the front of vehicle 110 to account for the drop in first vehicle front bumper 115. By so doing, the suspension, as will be presented herein, may be used to account for the offset to enable, in the event the collision occurs, first vehicle front bumper 115 and second vehicle front bumper 125 to at least initially absorb the impact of the collision.

Figure 3:
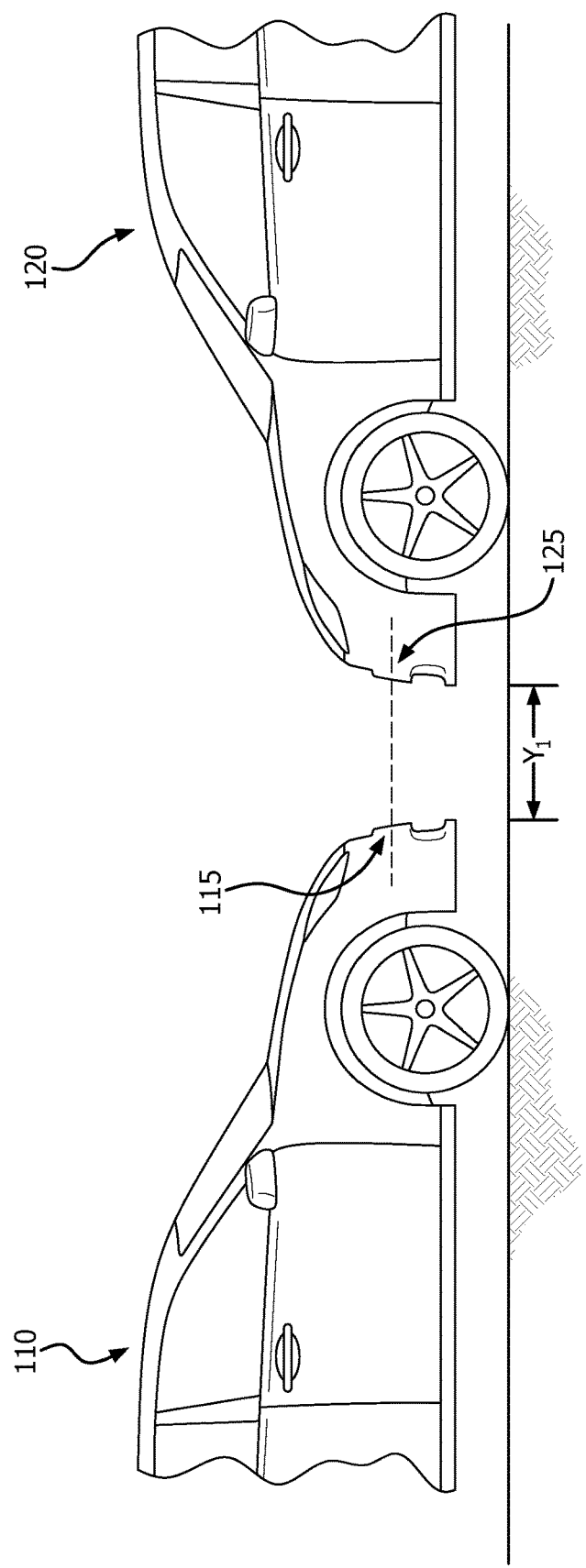
FIG. 3 illustrates the effect of the suspension accounting for the offset between the first vehicle front bumper and the second vehicle front bumper so that the bumpers are positioned to contact each other in the event that impact occurs.

As the first vehicle 110 continues to impact with the second vehicle 120, at some distance before impact Y1, FIG. 3 illustrates the effect of the suspension accounting for the offset between the first vehicle front bumper 115 and the second vehicle front bumper 125 so that the bumpers 115, 125 are positioned to contact each other in the event that impact occurs. The offset X (shown in FIGS. 1 and 2) between the first vehicle front bumper 115 and the second vehicle front bumper 125 is now essentially zero. Therefore, the first vehicle front bumper 115 and the second vehicle front bumper 125 will absorb at least initially the impact.

The correction of the offset between the first vehicle front bumper 115 and the object that the first vehicle 110 is going to impact, in this case second vehicle front bumper 125, may be performed in a feedback loop. In the case where constant braking is applied, the present system may calculate the amount of offset that needs to be accounted for by the suspension and apply that amount. This may be performed by calculating the amount of braking that would need or will occur and removing the dip associated with that amount of braking, or may be performed real-time using feedback to account for the dip that has occurred thus far during the applied braking.

In other situations, such as where the amount of braking varies before impact, the offset may be constantly changing. In such a situation, the suspension correction may be performed by calculation to best approximate the amount of offset to be removed, or may be removed in a feedback loop where the offset is constantly being removed to maintain proper correction up until impact.

Figure 4:
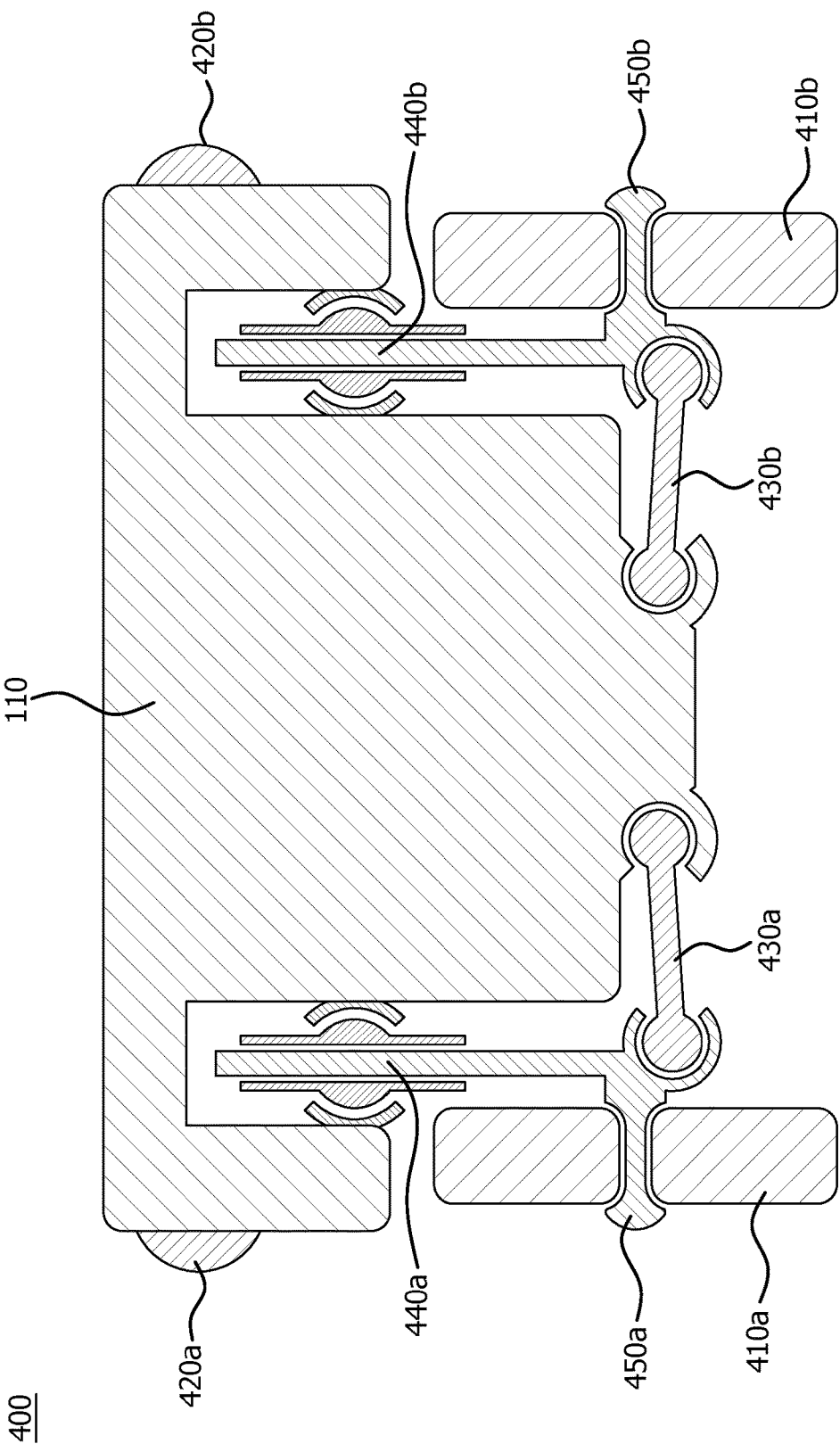
FIG. 4 illustrates a cut-through view of the first vehicle to show the suspension of the vehicle.

FIG. 4 illustrates a cut-through view 400 of first vehicle to show the suspension. Generally, suspension is the system of tires, tire air, springs, shock absorbers and linkages that connects a vehicle to its wheels and allows relative motion between the two. The suspension contributes to vehicle 110 handling and braking while keeping vehicle occupants comfortable and a ride quality reasonably well isolated from road noise, bumps, vibrations, and the like. In the illustrated suspension of FIG. 4, the suspension begins with the wheels 410, including left wheel 410a and right wheel 410b. The wheels 410 are each attached to a hub carrier 450, left hub carrier 450a for left wheel 410a and right hub carrier 450b for right wheel 410b, which may also be referred to as an axle. Each hub carrier 450 is interconnected to a control arm 430, left control arm 430a for left wheel 410a and right control arm 430b for right wheel 410b. Each hub carrier 450 is also interconnected to a damper 440, such as a shock absorber and spring; for example, including the left damper 440a for left wheel 410a and right damper 440b for right wheel 410b. Each of the dampers 440 and control arms 430 may be attached to the vehicle.

While the above described figure (FIG. 4) is provided to enable an understanding of the aspects of the suspension and how they may be used in the present invention, the specific type of suspension used is not important, as the connection for a vehicle is the same regardless, i.e., pivot points on the internal side with a spring damper assembly.

The bumper 420 is shown on vehicle 110. Bumper 420 may have a left portion illustrated in the cutaway as bumper portion 420a and a right portion illustrated in the cutaway as bumper portion 420b. Bumper portion 420a, bumper portion 420b, and a section of the bumper (not shown) may be combined to form the whole of the bumper (illustrated in FIGS. 1-3 as bumper 115, for example).

As would be understood in the case where the suspension of FIG. 4 illustrates a front suspension, as the vehicle 110 approaches impact and the brakes are applied there is a downward force on the front of vehicle 110 causing a dip to occur (to produce of value of X described above). The suspension is designed to minimize that movement, likely through the dampers 440. In an embodiment of the present invention, an active force may be applied to the dampers 440 to not only minimize the dip movement, but to counteract the occurring dip to maintain the impact position of bumpers 420.

This force may be applied using an active suspension which is a type of automotive suspension that controls the vertical movement of the wheels 410 relative to the vehicle 110 with an onboard system, rather than in a passive suspension where the movement is being determined entirely by the road surface. Active suspensions may use a type of actuator to raise (and lower) the vehicle 110. This adjustment may occur independently at each wheel 410 or may be performed on the front of the vehicle 110, back of the vehicle 110, left side, or right side of the vehicle.

The active suspension includes a damper or spring system that allows active movement of the vehicle body or wheel, and can change ride height of the vehicle with a reaction time based on brake application, allowing the vehicle to stay at a given height in the front, for example, during a braking event.

An onboard computer (not shown) detects movement from sensors throughout the vehicle and controls the action of the actuator to eliminate body roll and pitch variation, such as described above during braking. The movement may be countered by the active suspension to maintain the bumper 420 at an appropriate location.

Additionally, onboard computer may receive input providing information about the height desired for the bumper 420. This input may come from the collision avoidance detection system or the adaptive cruise control, for example. Other systems within the vehicle may be adapted to provide the input as well. These include the braking system, the camera system, the radar system, the LIDAR system, and other autonomous hardware available. Alternatively or additionally, extra sensors may be added to the vehicle to provide additional feedback for the inboard computer in order to minimize the height X.

A collision avoidance detection system generally is an automobile safety system designed to reduce the severity of a collision sometimes referred to as a pre-crash system, forward collision warning system, or collision mitigating system. Such a system may use radar, lasers and cameras to detect an imminent crash. Once the detection is done, these systems either provide a warning to the driver when there is an imminent collision or take action autonomously without any driver input (by braking or steering or both). Cars with collision avoidance may also be equipped with adaptive cruise control, and use the same forward-looking sensors for each.

The sensors used for collision avoidance and adaptive cruise control may also be utilized to provide input to the auto-leveling suspension regarding the height of an impediment that is headed for impact with the vehicle. In the example of the two cars, the sensors may be used to detect the height of the second vehicle front bumper 125, in order to determine the adjustment necessary to the first vehicle front bumper 115 to cause bumper-to-bumper impact. This input may be provided to the onboard computer system in order to actuate the active suspension to minimize the value for X.

FIG. 5 illustrates a method 500 for accounting for a mismatch that exists between a vehicle's bumper and potential impact point, including a dip associated with braking, using an active suspension. Method 500 includes determining that a mismatch exists between a vehicle's bumper and a potential impact point at step 510. This mismatch may occur due to braking that is occurring or going to occur, and/or may be a mismatch associated with different makes of vehicle having different design heights for the bumpers, for example. At step 520, method 500 may actuate the suspension to account for the determined mismatch. Additionally, method 500 may include accounting for upcoming conditions that may occur before or during impact that cause mismatch between the vehicle's bumper and the potential impact point at step 530. These upcoming conditions may occur, for example, because the vehicle systems are going to need to cause additional braking causing further dip in the bumper to occur. It would be obvious to those possessing an ordinary skill in the art that many upcoming conditions sensed by the vehicle may be accounted for before the bumper dip occurs and the conditions presented herein are provided by way of example only.

Alternatively or additionally, ride height sensors on the vehicle may be used to provide information regarding when the suspension moves more than a certain amount. This amount may be 5 mm, or between 2 mm and 5 mm, for example. With this information on the vehicle, limits may be set for front wheels and rear wheels that if the limits are met, the vehicle is adjusted by raising or lowering the vehicle using the suspension to reset the ride height sensors reading back to the desired (target) height.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied herein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of the claims are therefore to be embraced therein.

What is claimed is:

1. A method for accounting for a mismatch that exists between a bumper of a vehicle and a potential impact point associated with an object using an active suspension of the vehicle, the method comprising:
   detecting, by sensors of the vehicle, an impending collision between the vehicle and the object;
   determining, prior to the collision, an amount of braking applied for the vehicle;
   determining, based on the amount of braking applied for the vehicle and prior to the collision, that a mismatch will exist between the bumper of the vehicle and the potential impact point associated with the object at a time of the collision;
   determining, based on the amount of braking applied for the vehicle and prior to the collision, an amount of offset between the bumper of the vehicle and the potential impact point associated with the object at a time of the collision; and
   actuating, prior to the collision, the active suspension of the vehicle to account for the determined mismatch and continually remove a portion of the amount of offset until the time of the collision.

2. The method of claim 1, wherein the object is a second vehicle and the mismatch results from braking performed by the vehicle and the second vehicle prior to the collision.

3. The method of claim 2, wherein the amount of braking applied for the vehicle is constant prior to the collision.

4. The method of claim 2, wherein the mismatch is associated with a difference between a design height of the bumper of the vehicle and a design height of a bumper of the second vehicle, and wherein the potential impact point associated with the object is the bumper of the second vehicle.

5. The method of claim 1, wherein the mismatch includes a dip of the front suspension of the vehicle that is associated with the amount of braking applied for the vehicle prior to the collision.

6. The method of claim 1, wherein determining the amount of offset between the bumper of the vehicle and the potential impact point associated with the object at the time of the collision further comprises:

determining that the vehicle requires an additional amount of braking prior to the collision that causes a further mismatch between the bumper of the vehicle and the potential impact point associated with the object.

7. The method of claim 6, further comprising:

actuating, prior to the collision, the active suspension of the vehicle to account for the further mismatch determined.

8. The method of claim 1, wherein the amount of braking varies prior to the collision.

9. A system for accounting for a mismatch existing between a bumper of a vehicle and a potential impact point associated with an object, the system comprising:

a first sensor that detects an impending collision between the vehicle and the object;

a second sensor that detects, prior to the collision, an amount of braking applied for the vehicle;

a third sensor that detects a height of the potential impact point associated with the object relative to a height of the bumper of the vehicle;

a computer that determines, prior to the collision and based on the amount of braking applied for the vehicle, that a mismatch will exist between the bumper of the vehicle and the potential impact point associated with the object at a time of the collision and an amount of offset between the bumper of the vehicle and the potential impact point associated with the object at the time of the collision; and an active suspension of the vehicle configured to be actuated prior to the collision to account for the determined mismatch and continually remove a portion of the amount of offset until the time of the collision to enable improved alignment of the bumper and the potential impact point associated with the object.

10. The system of claim 9, wherein the object is a second vehicle and the mismatch results from braking performed by the vehicle and the second vehicle prior to the collision.

11. The system of claim 10, wherein the amount of braking applied for the vehicle is constant prior to the collision.

12. The system of claim 10, wherein the mismatch is associated with a difference between a design height of the bumper of the vehicle and a design height of a bumper of the second vehicle, and wherein the potential impact point associated with the object is the bumper of the second vehicle.

13. The system of claim 9, wherein the mismatch includes a dip of the front suspension of the vehicle that is associated with the amount of braking applied for the vehicle prior to the collision.

14. The system of claim 9, wherein determining the amount of offset between the bumper of the vehicle and the potential impact point associated with the object at the time of the collision further comprises determining that the vehicle requires an additional amount of braking prior to the collision that causes a further mismatch between the bumper of the vehicle and the potential impact point associated with the object.

15. The system of claim 14, further comprising actuating prior to the collision, the active suspension of the vehicle to account for the further mismatch determined.

16. The system of claim 9, wherein the amount of braking varies prior to the collision.

17. The system of claim 9, wherein the third sensor is a ride height sensor of the vehicle.

18. The system of claim 9, wherein the first sensor is part of at least one other vehicle system including a braking system, a camera system, a radar system, a LIDAR system, and other autonomous hardware of the vehicle.

* * * * *